Patented Jan. 5, 1932

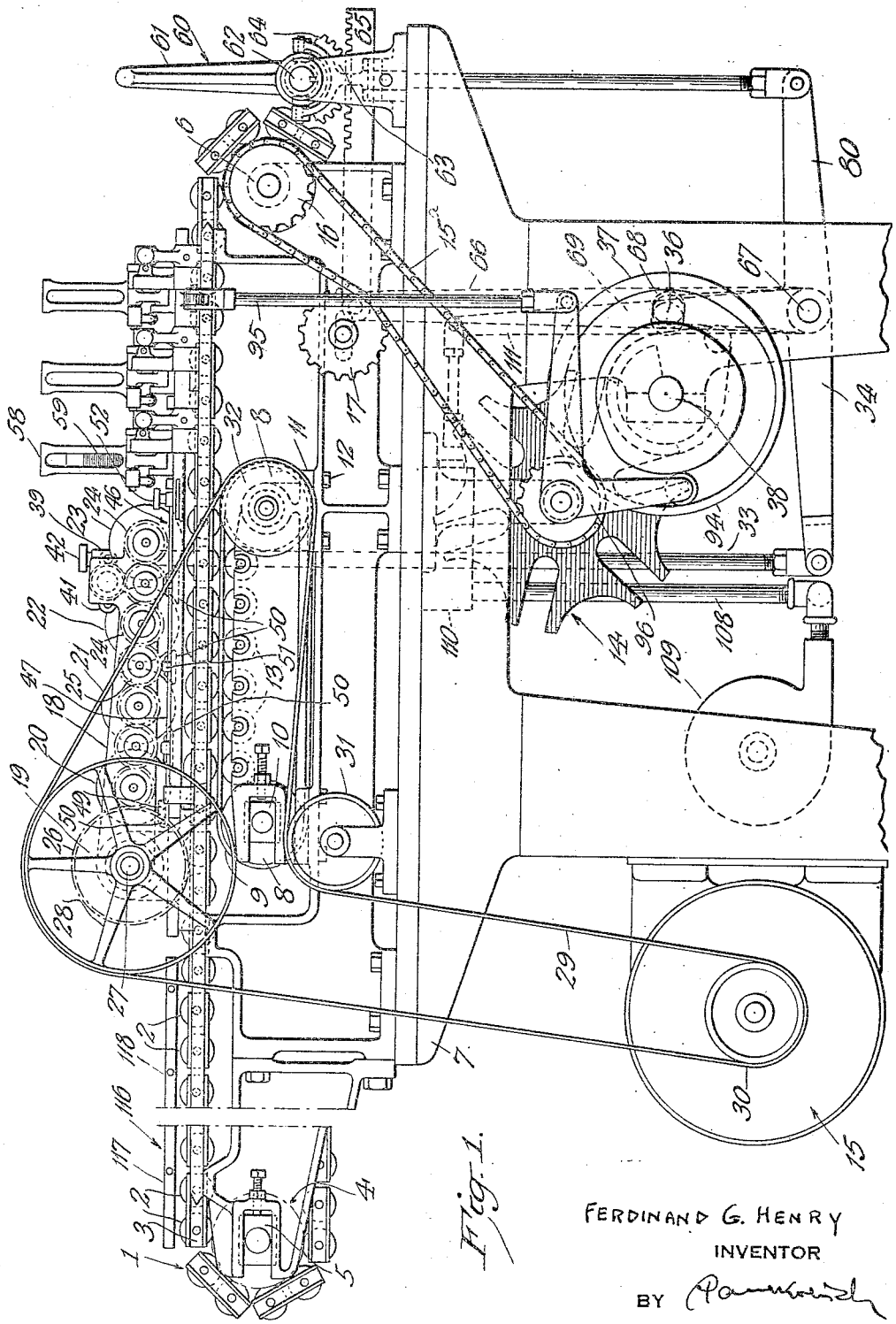

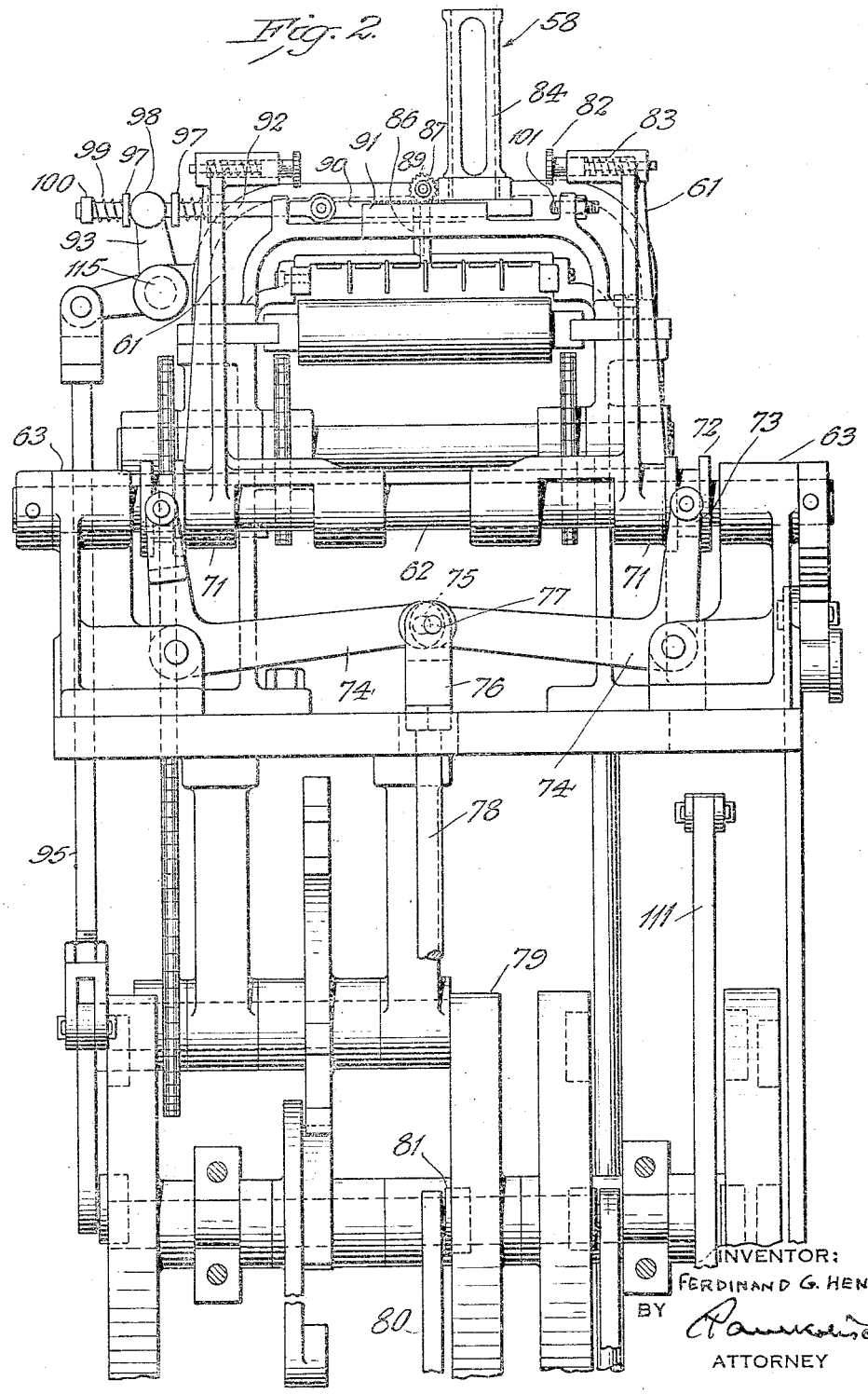

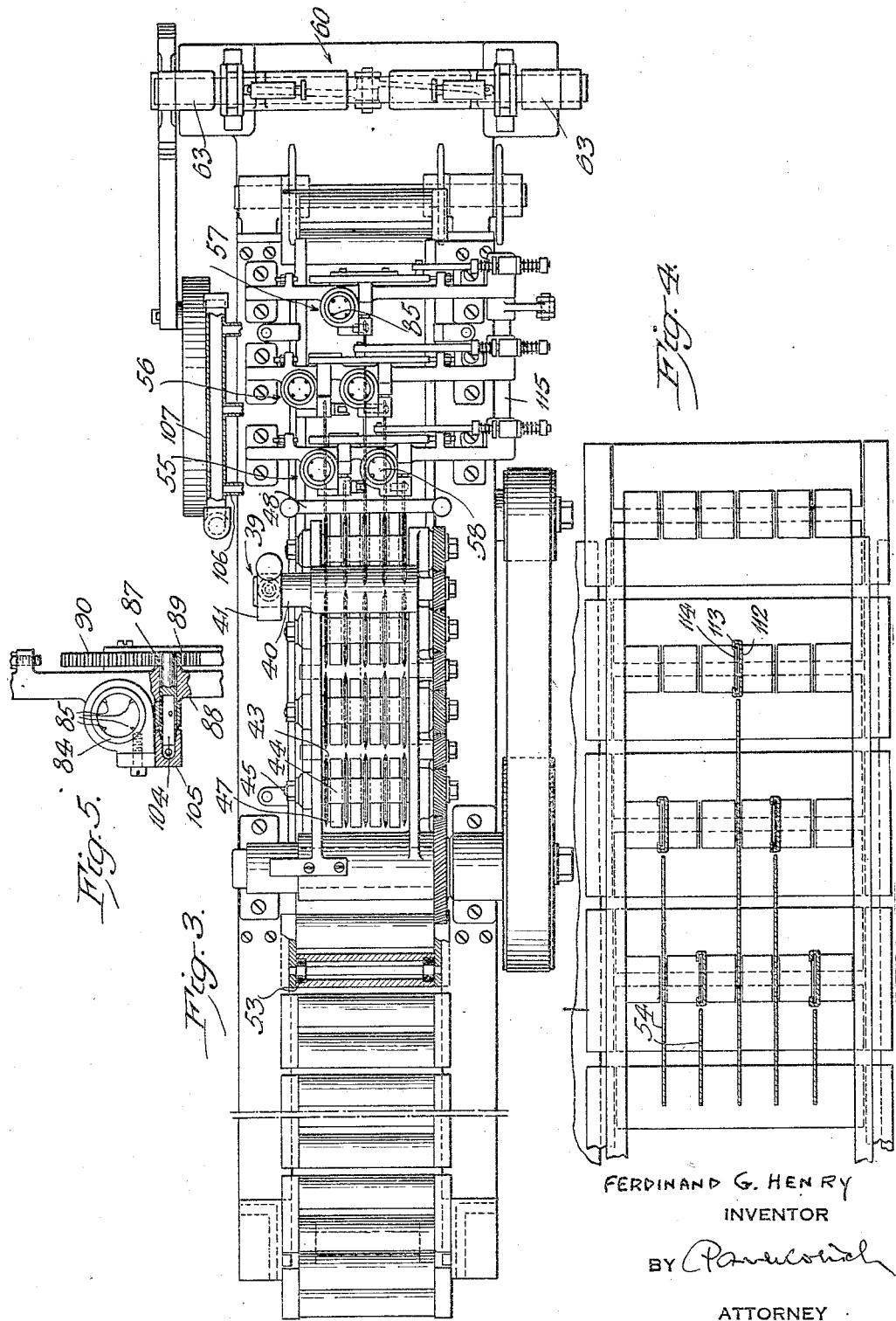

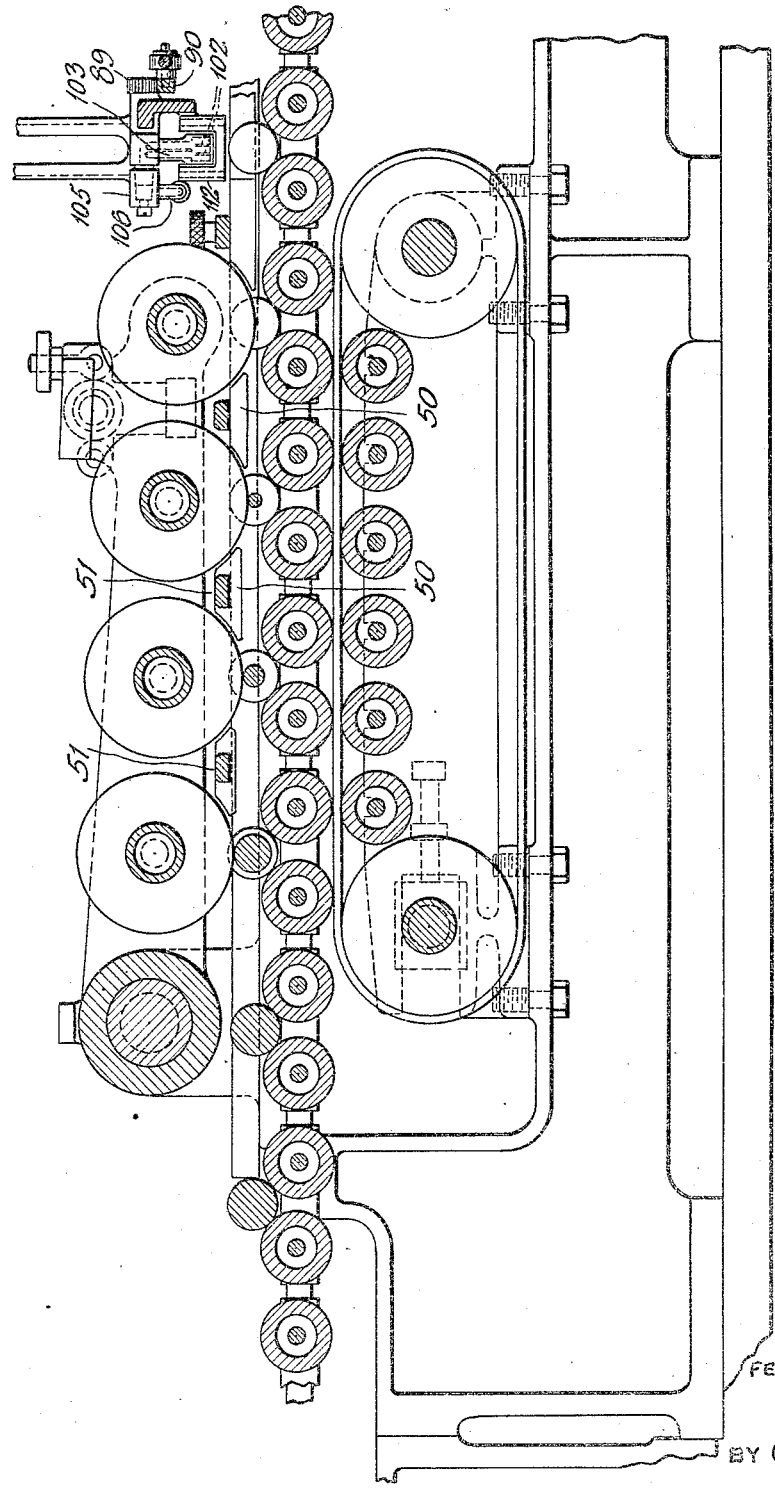

1,840,095

UNITED STATES PATENT OFFICE

FERDINAND G. HENRY, OF PHILADELPHIA, PENNSYLVANIA, ASSIGNOR, BY MESNE ASSIGNMENTS, TO THE SWEETS COMPANY OF AMERICA, INC., OF NEW YORK, N. Y., A CORPORATION OF VIRGINIA

CANDY TREATING MACHINE

Application filed January 11, 1929. Serial No. 331,808.

This invention relates to candy treating machinery, more particularly to machinery for severing a bar of candy or similar material into lengths and placing spacer members between the severed pieces.

It is an object of the present invention to provide a machine which will receive bars of candy or other hard or plastic material, sever the bars into short lengths and place between the lengths spacer members such as discs of waxed paper, then deliver the severed and spaced bar from the machine as a unit.

In operating on pieces of plastic material such as bars of candy difficulty is encountered because the material has a tendency to be deformed under pressure or to stick to the handling machinery. This is especially true where it is desired to sever a piece of material. In accordance with my invention I provide a machine for cutting into several pieces a bar of plastic material such as candy and for placing between each of the adjacent severed pieces a disc of wax paper or other spacing material, and means for delivering the severed and spaced bar from the machine as a whole. This machine comprises a conveyer in the form of a chain carrying a plurality of pairs of rollers which serve to support the bars of material, a plurality of rotary disc cutters mounted on a reciprocable frame for cutting off the bars with a step by step motion, a group of transfer fingers for removing a spacer disc from a magazine and for placing the disc between adjacent pieces of the severed bar. For removing the bar from the machine as a whole I arrange a pair of gripping fingers which move toward each other to seize the bar unit at each end and then rock to another position where the fingers open and drop the unit. The other position may, for example, be a pocket on the conveyer chain of a wrapping machine or the like, which acts in some further manner upon the bar unit. For rotating the rollers supporting the material to be operated upon I arrange a belt which is drawn between the rollers of the conveyer chain and a set of abutment rollers.

The objects and advantages already mentioned, as well as others, will be made clear in the following description taken in connection with the accompanying drawings.

In the drawings Fig. 1 illustrates in side elevation a machine constructed in accordance with my invention.

Fig. 2 is an end elevation of the machine shown in Fig. 1.

Fig. 3 is a plan view partly in section of the machine shown in Fig. 1.

Fig. 4 is a plan view partly in section of the machine showing the guide plates for the severed articles.

Fig. 5 is a plan view partly in section of the finger for transferring spacing discs from the magazine to between the severed articles.

Fig. 6 is a sectional side elevation of a portion of the conveyer showing the cutting mechanism and disc feeding mechanism.

Referring more particularly to the drawings, reference numeral 1 indicates a chain conveyer for the candy bars to be severed, comprising a plurality of pairs of rollers 2 supported by end bearing blocks 3. This chain passes around a pair of pulleys 4 at each end of the machine, which are in turn supported in journals 5 and 6 attached to the frame 7 of the machine. The journal 5 is made adjustable longitudinally of the machine so that the chain may be tightened at will. The rollers of the conveyer are mounted on ball-bearings 53, as best shown in Fig. 3. Positioned under the middle portion of the conveyer is a pair of pulleys 8 around which passes a belt 9 of rubber or fabric. The two pulleys are supported in suitable journals, one of which, 10, is made adjustable longitudinally of the machine so that the belt may be tightened whenever desirable. The height of the pulleys 8 may be varied at will by placing shims between the sub-frame 11 which supports them, and the main frame of the machine. The sub-frame is held to the main frame by cap screws 12 and hence it is possible easily to insert the shims. Rotatably mounted in the sub-frame 11 are a plurality of abutment rollers 13 upon which rides the belt 9. These abutment rollers cause sufficient pressure to be exerted by the belt 9 against the rollers 2 positively to insure driving of the rollers. A Geneva movement 14 is provided for moving the conveyer ahead a step at a time. This Geneva movement is driven by suitable mechanism from a main driving motor 15. The Geneva movement 14 is arranged to drive the conveyer by means of a chain 15ª which runs over a sprocket 16 connected to the driving pulley 4. For tightening the chain 15 an idler 17 is adjustably supported in the frame of the machine. Mounted above the top of the middle portion of the conveyer is a cutter arm 18. This arm is journalled to the frame of the machine at 19 and carries rotatably mounted at intervals along its length a series of groups of cutters 20, 21, 22 and 23. The shaft for supporting each group of cutters carries a drive gear 24 and between each of the adjacent drive gears is mounted an idler gear 25 so that all of the cutters turn in the same direction. For driving all of the cutters a main gear 25 is meshed with the drive gear 24 nearest the support of the cutter arm on the frame. This main gear is keyed to a shaft 27 rotatably mounted on the main frame of the machine. Shaft 27 has fixed thereto a pulley 28 over which runs a main driving belt 29. The belt 29 passes around pulley 30 of the driving motor, over an idler 31 around a pulley 32 coupled to the pulley 8, thence around the pulley 28 and back to the motor. The belt may be tightened by moving the idler pulley 31, which is adjustably fastened to the frame of the machine. For reciprocating the arm 18 a push rod 33 is used. This push rod is connected to one end of a bell crank 34 rockably mounted on a shaft 67 secured to the frame of the machine and having a roller 36 at its other end which engages with a track cam 37 on the cam shaft 38 which serves to drive Geneva movement 14. The shape of the cam 37 is such to draw the arm 18 down toward the conveyer when the conveyer is at a standstill so as to sever the articles carried by the conveyer. The top end of the push rod 33 has a two piece bearing 39 which is adapted to engage a pin 40 secured to the arm 18. The bearing 39 has at one side a hinge 41 and at the other side a thumb screw 42 which serves to hold the two halves of the bearing together. When it is desired to inspect the part of the conveyer under the arm 18, the thumb screw 42 is released and the top half of the bearing swung around its hinge out of engagement with the pin 40 after which the arm 18 may be rotated to a vertical position permitting free access to the conveyer.

The cutter groups supported by the arm 18 each comprise five cutter discs 43 which are spaced from each other by washers 44. The cutters and washers are mounted on a shaft 45 which carries at one end the drive gear 24. The cutter discs 43 may be made with a sharp knife edge but are preferably fashioned with a tapered edge having a flat peripheral portion which may be, for example, $\frac{1}{32}$ of an inch wide. The width of the discs 43 is great enough to space apart slightly the severed portions of the candy bar. As the candy bar operated upon is slightly plastic the cutters in passing through the bar force the severed pieces apart leaving a space.

Interposed between the bottom side of the cutter arm and the conveyer is a guard 46. This guard comprises a plurality of spaced longitudinal strips 47 which are interconnected at one end by a cross strip 48 and at the other end by another cross strip 49 which is hinged to the frame of the machine at 50, so that the guard may be lifted away from the conveyer after the cutter arm has been swung out of place. The function of the strips 47 is to hold the candy bar down on the conveyer during the cutting off process. For keeping the bar in proper alignment so that the cut made by the first group of rollers will be in the correct alignment with the second group of cutters when the conveyer advances, fingers 50 are attached to the guard 46. These fingers enter the groove made by the cutter discs and serve to maintain the pieces of candy in their proper relative position as they travel through the machine. The fingers 50 are held in position by rods 51 which extend across the strips 47 and are fastened thereto. For maintaining the guard in its downward position a pair of latches 52 are provided. After the bars of candy have been completely severed by the cutters they are held in spaced relation by guide strips 54 and advanced by steps to positions under the spacer disc feeding mechanisms 55, 56, 57. The two mechanisms 55 and 56 each consist of a pair of disc magazines 58 serving to hold a pile of spacer discs 59 which are fed from the magazine one by one and dropped between adjacent pieces of the severed candy bar, in a manner to be explained more fully hereinafter.

By referring to Fig. 3, it will be seen that two discs are dropped into position at 55, two at 56 and one at 57. After all of these discs have been properly positioned the severed and spaced bar is removed from the machine as a unit by the transfer mechanism 60. The transfer mechanism comprises a pair of oscillating arms 61 feather-keyed to a shaft 62 so as to be movable longitudinally of the shaft but incapable of movement around the shaft. The shaft 62 is journalled in bearings 63 and carried secured thereto a gear sector 64 which meshes with a reciprocable rack bar 65 secured to one end of a lever 66 pivotally mounted on shaft 67. Intermediate the ends of the lever 66 is a cam rider 68 which cooperates with a cam 69 mounted on the shaft 38, driven by the driving motor 15. As the conveyer advances step by step the arms 61 swing over to seize them between a candy bar during the interval when the conveyer is stopped and then as the conveyer advances to remove the bar from the machine. The arms may, for example, place the bar on the conveyer of a cooperating wrapping machine. Each of the arms 61 has at the end a bearing sleeve 71 mounted on the shaft 62. At one end of this bearing sleeve is a grooved collar 72 with which engages an operating yoke 73. The yoke 73 forms one end of a bell crank 74, the other end of which is provided with a slot 75. The length of the arms 74 is such that the two slots in the ends thereof coincides. A clevis 76 is fastened to the two arms 74 by means of a pin 77 which passes through the slots and the end of the clevis. The clevis 76 is fastened to a push rod 78 which is reciprocated at the proper interval of time by a cam 79 through the agency of a bell crank 80, one end of which is provided with a cam rider 81. The gripping ends of the oscillating arm 61 each have a plunger 82 slidably mounted and furnished with a compression spring 83, which insure that the candy bar will be firmly yet resiliently gripped during its transfer process.

Each of the magazines 58 consists of a tubular portion 84 having at its bottom a series of projections 85 which support the discs and prevent them from falling out of their own accord through the open bottom of the tubular portion 84. For removing discs one by one and dropping them between adjacent pieces of candy a transfer finger 86 is utilized. This transfer finger is secured to a shaft 87 rockably mounted in the frame of the machine at 88. One end of the shaft carries a pinion 89 which meshes with a rack 90 mounted in a guide 91 and interlinked through a connecting rod 92 with a bell crank 93. The bell crank 93 is oscillated by a cam 94 through the agency of a linkage comprising a push rod 95 and a bell crank 96. As the cam rotates the rack is reciprocated, causing the finger 86 to be moved to an angle of 90° from a position against the bottom of the pile of discs in the magazine 58, to a vertical position directly in alignment with an opening between adjacent pieces of candy. In order to make sure that there will be no inaccuracy introduced in the mechanism because of wear an automatic spring take-up mechanism is used. This mechanism comprises a pair of spring pressed washers 97 encircling the connecting rod 92 which passes through an enlarged opening in the end 98 of the bell crank 93. The washers 97 are pressed against the end 98 by springs 99 abutting against collars 100 pinned to the connecting rod. As the bell crank oscillates the connecting rod is reciprocated through pressure of the end of the bell crank against the springs 99 thereby causing the transfer finger 86 to be rocked. The stroke of the cam 94 is such that the bell crank 93 is oscillated through an angle corresponding to a greater angular movement of the transfer finger 86, than 90°. In order to limit the movement of the finger to 90° an adjustable stop 101 is positioned adjacent the end of the rack bar 90, which serves to stop the bar when the finger is in the correct position to remove the disc from the magazine.

The finger 86 is provided with a plurality of openings 102 which communicate through air ducts 103 with an opening 104 in the shaft 87. The end of the shaft is tapered and rotates in a connection 105, to which is attached a suction pipe 106 leading through a manifold 107 and pipe 108 to a vacuum pump 109.

For controlling the suction on the finger 86 a valve 110 is inserted in the pipe line 108. This valve is opened and closed at the proper intervals of time by a cam actuated lever 111. During operation of the machine the finger 86 rocks up against the bottom of the pile of discs in the magazine 58, then returns to a vertical position directly above the opening between adjacent pieces of candy, carrying a disc which has been removed by suction applied to the finger. The suction is applied just as the finger approaches the bottom of the magazine and is cut off just after the finger has brought the disc adjacent to the candy in its proper position to be dropped. As the finger swings downwardly carrying the disc, it passes between a U-shaped guide member 112 which has grooves 113 at the edges thereof. As the arm moves between the U-shaped guide the edges of the disc snap into the grooves in the position shown in Fig. 4, wherein the disc is indicated by reference numeral 114. The arm moves back a slight distance further, the suction being cut off at the same instant of time that the disc is entirely detached from the finger. As soon as the disc is detached it falls by gravity directly between the pieces of candy.

The spacer disc feeding mechanisms 55 and 56 each consist of a pair of magazines and transfer fingers. The two mechanisms are just the same as that described, the only difference being that they are driven by a common rack. The mechanism at 57 comprises but a single magazine and finger. All of the bell cranks 93 are fastened to a common shaft 115 so that all of the transfer mechanisms are worked by the single cam 94. In the drawings five disc magazines and mechanisms are shown, but it will be understood that if the number of pieces of candy is such that more discs are needed, more transfer mechanisms may be used, for example, by adding another magazine to 57 or by putting on additional groups of magazines.

The candy bars to be operated upon are fed on to the conveyer by hand and in order to insure that the bars will be placed between pairs of rollers in the proper manner and not between one roller of one pair and another roller of another pair, a guard 116 is placed over the conveyer at the feeding position. The guard comprises a pair of side bars 117 and a series of interconnecting rods 118. The rods 118 are arranged so as to permit candy bars to be placed only between the proper pairs of rollers when the conveyer is stationary.

The operation of the machine is as follows: Bars of candy or other material to be acted upon are placed between the pairs of rollers 2 at the left-hand end of the machine as viewed in Fig. 1. The conveyer is advanced step by step by the Geneva movement mechanism 14, carrying the bars step by step beneath the cutter arm 18, which is lifted vertically by push rod 33 at the instant when the conveyer is to advance so as to prevent derangement of the candy bars. In the interval of time when the conveyer is stationary the cutter bar is rocked downwardly causing the cutters 20 to be pressed against the bar. The cutters are all the time being rotated through the belt 29, pulley 28 and intermediate gearing, and the candy bars are likewise rotated through the agency of the belt 9 which presses against the bottom side of the rollers 2. The belt travels at such speed that the candy rotates more slowly than the cutter knife and so that the surface of the cutters and of the bar move in the same direction. The belt 9 is held in firm engagement with the rollers 2 by the abutment rollers 13.

The first group 20 of cutter discs cut only about one-fourth of the way through the bar, then as the conveyer advances the groups 21, 22 and 23 of cutters likewise cut approximately one-fourth of the way so that after the bar has been advanced past the last group of cutters it is entirely severed into several pieces. Because of the fact that both the candy bar and the cutters are rotating a very clean cut is made which produces uniform, perfectly cylindrical pieces of candy. The speed of the cutter discs is preferably several times greater than that of the candy bar so that the discs slip with respect to the bar giving a sort of cutting action. The belt drive 9 serves greatly to speed up the operation of the machine for without it the cutters would be able to turn the candy bars only very slowly, if at all. If the bars were not turned during the cutting process deformation of the pieces of candy would result.

After the bar has been entirely severed the conveyer advances another step bringing the pieces beneath the disc transfer mechanism 55. While it is in this position the transfer fingers 86 are rocked by the rack and pinion mechanism, against the bottom of the pile of discs in the magazine, suction applied to the finger and a disc removed thereby from the magazine. The finger is then rocked downwardly to a vertical position whereupon the disc snaps into the grooves 113 of guide 112, the suction is cut off and the discs drop freely between the adjacent pieces of candy, which have been separated a slight distance by the action of the cutters. The conveyer advances another step, moving the pieces of candy to transfer mechanism 56 where two more discs are positioned, then another step to mechanism 57, where the last disc is positioned. The final step of the conveyer bringing the severed and spaced pieces of candy to a point where the oscillating arms 61 seize them as a unit and remove them from the machine. As the pieces of candy move away from the cutters where they have just been severed, toward the disc transfer mechanism, they are held spaced apart by the guide strips 54 which are of approximately the same width as the cutter discs. For insuring best operation of the machine the width of the cutter discs and the guide strips 54 should be great enough so that the spacer discs can slide freely into position between the pieces of candy.

The machine has been described as suitable for operating on candy, but it is adapted for use with other kinds of materials which are sufficiently plastic to be severed with the form of cutter shown. It is necessary merely that the cutters sever the bar of material into a plurality of pieces spaced from each other a slight distance so that the spacing discs can be slipped between the pieces. The cutters illustrated are adapted to force their way into the more or less plastic material of the bar leaving a suitable space. However, if the material acted upon is hard it would be necessary to utilize a different form of cutter, for example, one having saw teeth adapted to remove sufficient material to leave space for the positioning of the spacer members.

While I have described a particular embodiment of my invention for the purpose of illustration, it is to be understood that the invention is capable of various modifications and adaptations and that the invention is to be limited only as expressed in the appended claims.

What I claim is:

1. In a candy treating machine, a conveyer comprising a plurality of pairs of rollers, means for advancing the conveyer step by step so that pairs of said rollers stop successively at a station, means for rotating the pair of rollers at the station, and a set of rotatable cutters mounted for movement towards said pair of rollers.

2. In a cutting machine, a pair of rollers for supporting a bar of stock, means for rotating said rollers to turn the bar of stock, a rotatable cutter for pressing against said bar and severing it, and means for positively rotating said cutter to cause its periphery to move in the same direction as the surface of the bar of stock.

3. In a cutting machine, a conveyer having a plurality of pairs of rollers for supporting bars of stock, means for advancing said conveyer step by step so that said pairs of rollers halt for a period at successively arranged stations, means for rotating said rollers during said period to turn a bar of stock positioned on the rollers and severing means for pressing against said bar while the rollers supporting it are being revolved.

4. A cutting machine according to claim 3 wherein the severing means comprising a plurality of rotatable cutters in a swingable frame, some of said cutters being arranged to move a certain distance towards the rollers at one station and other of said cutters to move a greater distance towards the rollers at another station so as to sever a bar placed on said rollers by steps at successive stations.

5. The method of severing a bar of candy which comprises rotating the bar, pressing a cutter against the bar and rotating the cutter so that the peripheral speed of the cutter is about four times that of the bar and the periphery of the cutter moves in the same direction as the surface of the candy.

6. A conveying mechanism comprising a chain, a plurality of pairs of supporting rollers mounted on said chain, a plurality of abutment rollers mounted beneath said chain, a driving belt supported by a pair of pulleys and adapted to pass between the peripheries of the supporting rollers and abutment rollers.

7. In a cutting mechanism, a conveyer comprising a plurality of pairs of cooperating rollers, means for advancing said conveyer, a cutting means comprising a rotatable disc positioned above said conveyer and adapted to move towards said conveyer so as to press against and partially sever a bar of material placed on one of said pairs of rollers and means for periodically moving said cutter towards and away from said conveyer.

8. In a cutting machine, a conveyer comprising means for rotatably supporting bars of material, a cutter frame positioned above said conveyer, a plurality of disc-like cutters rotatably mounted on said frame, and means for moving said frame towards and away from the conveyer so as to engage with bars of material carried thereby.

9. In a cutting machine, a conveyer, a cutter frame mounted above said conveyer, said frame comprising a pair of bearing members journaled at one end on a rotatable shaft, a driving gear carried by said shaft, a plurality of groups of cutters rotatably supported in said frame and geared together, the gear of one of said groups intermeshing with said driving gear.

10. In a candy treating machine, a conveyer for supporting a plurality of bars of candy in spaced relation, means for severing a bar of candy into several pieces, and means for placing a spacing member between each of said pieces and its neighbor.

11. In a candy treating machine, a conveyer for supporting a plurality of bars of candy, means for separating said bars into a plurality of pieces, means for placing a spacer between adjacent pieces, and means for removing said pieces as a unit from said conveyer.

12. In a candy treating machine, a conveyer comprising a plurality of pairs of rollers adapted rotatably to support bars of candy, a plurality of stations, and means for advancing said conveyer intermittently past said stations, a rotatable cutter at one of said stations, means for rotating said cutter, means for moving said cutter into engagement with a bar of candy, and means for rotating said rollers so that the periphery of the bar of candy moves in the same linear direction at its point of contact with said cutter as the periphery of the cutter.

13. In a candy treating machine, a conveyer for advancing a plurality of pieces of candy spaced from one another, a magazine for holding spacer members, and means for removing a spacer member from said magazine and positioning it between two adjacent pieces of candy.

14. In a candy treating machine, a magazine adapted to hold spacer members in a given position, means for moving two pieces of candy in spaced relation past said magazine and a transfer finger for extracting a spacer member from said magazine and placing it between said pieces of candy.

15. In a flexible disc feeding mechanism, means for removing a disc from a magazine and moving it into a vertical position, and a pair of grooved guides for receiving the edges of the disc to guide it to a given path, said guides being spaced apart a distance less than the normal width of said disc, so that the disc is forced to bend on entering the grooves in said guides.

16. A candy treating machine is accordance with claim 10 wherein the severing means are adapted to force the several pieces apart, to permit the easy insertion of the spacing members.

17. A candy treating machine in accordance with claim 10 wherein means is provided for aligning the severed pieces prior to the insertion of the spacing members.

18. In a cutting machine, a cutter frame comprising a pair of bearing members, disc like cutters rotatably mounted on said bearing members in a plurality of groups spaced longitudinally of said frame, and gear means for rotatably interconnecting said cutter discs.

19. In a candy treating machine, a magazine adapted to hold a stack of horizontally disposed spacer members, means for moving two pieces of candy in spaced relation past said magazine, and a transfer finger adapted to move through substantially 90 degrees to remove a spacer member from the magazine, turn it on edge and drop it between the two pieces of candy.

In testimony whereof, I have signed my name to this specification, this 8th day of January, 1929.

FERDINAND G. HENRY.